United States Patent
Jang et al.

(10) Patent No.: US 9,162,132 B2
(45) Date of Patent: Oct. 20, 2015

(54) VIRTUAL GOLF SIMULATION APPARATUS AND SENSING DEVICE AND METHOD USED FOR THE SAME

(75) Inventors: Hyung Wook Jang, Daejeon (KR); Hyun Jin Park, Daejeon (KR); Hyung Sik Yoon, Daejeon (KR); Hyun Dam Jeong, Daejeon (KR)

(73) Assignee: GOLFZON CO., LTD., Daejeon (KR)

( * ) Notice: Subject to any disclaimer, the term of this patent is extended or adjusted under 35 U.S.C. 154(b) by 166 days.

(21) Appl. No.: 14/004,930

(22) PCT Filed: Mar. 22, 2012

(86) PCT No.: PCT/KR2012/002072
§ 371 (c)(1),
(2), (4) Date: Sep. 13, 2013

(87) PCT Pub. No.: WO2012/128568
PCT Pub. Date: Sep. 27, 2012

(65) Prior Publication Data
US 2014/0004967 A1    Jan. 2, 2014

(30) Foreign Application Priority Data
Mar. 22, 2011    (KR) ........................ 10-2011-0025152

(51) Int. Cl.
| | |
|---|---|
| *A63F 13/00* | (2014.01) |
| *A63B 69/36* | (2006.01) |
| *G09B 9/00* | (2006.01) |
| *G09B 19/00* | (2006.01) |
| *A63B 67/02* | (2006.01) |

(52) U.S. Cl.
CPC ............. *A63B 69/3658* (2013.01); *A63B 67/02* (2013.01); *G09B 9/00* (2013.01); *G09B 19/0038* (2013.01)

(58) Field of Classification Search
CPC ........... A63F 13/573; A63F 2300/1087; A63F 2300/1093; A63F 2300/69; A63F 2300/8011; A63F 2300/8082
USPC ................................. 473/151, 152, 156, 199
See application file for complete search history.

(56) References Cited

U.S. PATENT DOCUMENTS

| | | | | |
|---|---|---|---|---|
| 2007/0298898 | A1* | 12/2007 | Kiraly ........................... | 473/131 |
| 2008/0182685 | A1* | 7/2008 | Marty et al. .................. | 473/407 |
| 2008/0287208 | A1* | 11/2008 | Sato et al. ..................... | 473/199 |
| 2010/0304876 | A1* | 12/2010 | Hohla et al. .................. | 473/199 |
| 2011/0292203 | A1 | 12/2011 | Kim | |
| 2012/0214606 | A1* | 8/2012 | Ueda ............................. | 473/199 |

FOREIGN PATENT DOCUMENTS

| | | |
|---|---|---|
| JP | H11-213167 A | 8/1999 |
| JP | 2009-247642 A | 10/2009 |

(Continued)

*Primary Examiner* — James S McClellan
(74) *Attorney, Agent, or Firm* — Revolution IP, PLLC

(57) ABSTRACT

Disclosed are a virtual golf simulation apparatus in which any position of a hitting mat, on which a user places a ball, is recognized to easily and accurately find the position of the ball even when a slope is realized with respect to a swing plate and the swing plate is sloped at a predetermined angle, and it is possible to accurately sense when hitting has been performed by the user using a relatively inexpensive sensing device without an additional trigger sensor, thereby reducing costs and improving sensing accuracy and reliability, and a sensing device and method used for the same.

12 Claims, 9 Drawing Sheets

(56) References Cited

FOREIGN PATENT DOCUMENTS

| KR | 10-2003-0042134 A | 5/2003 |
| KR | 10-2003-0044601 A | 6/2003 |
| KR | 10-2003-0075940 A | 9/2003 |
| KR | 10-0937922 B1 | 1/2010 |
| KR | 10-0953132 B1 | 4/2010 |

* cited by examiner (a)

(b)

(a)

(b)

(c)

(d)

(a)

(b)

ND SENSING DEVICE AND METHOD USED
VIRTUAL GOLF SIMULATION APPARATUS AND SENSING DEVICE AND METHOD USED FOR THE SAME

CROSS REFERENCE TO PRIOR APPLICATIONS

This application is a National Stage Application of PCT International Patent Application No. PCT/KR2012/002072 filed on Mar. 22, 2012, under 35 U.S.C. §371, which claims priority to Korean Patent Application No. 10-2011-0025152 filed on Mar. 22, 2011, which are all hereby incorporated by reference in their entirety.

TECHNICAL FIELD

The present invention relates to a virtual golf simulation apparatus and a sensing device and method used for the same, and more particularly to a virtual golf simulation apparatus in which a virtual golf course is imaged and simulated, and the trajectory of a golf ball hit by a user is sensed by a sensing device and is simulated on the virtual golf course, and a sensing device and method used for the same.

BACKGROUND ART

In recent years, various devices have been developed which allow users to enjoy popular sports games, such as baseball, soccer, basketball and golf, in rooms or in specific places through simulation in the form of interactive sports games.

Particularly, in recent years, a so-called screen golf system has been developed in which, when a user swings a golf club to hit a golf ball placed on a hitting mat, a sensing device senses the hit golf ball to extract physical information on the moving golf ball so that the trajectory of the golf ball can be simulated on a virtual golf course, thereby allowing the user to enjoy golf in virtual reality.

In order to simulate sports using balls, such as golf balls, in such interactive sports games, much research has been conducted into various sensing systems for accurately sensing physical information on a moving ball, i.e. movement of a ball.

For example, various sensing devices, such as a sensing device using an infrared sensor, a sensing device using a laser sensor, a sensing device using an acoustic sensor and a sensing device using a camera sensor, have come onto the market.

DISCLOSURE

Technical Problem

The present invention to provide a virtual golf simulation apparatus and a sensing device and method used for the same in which any position of a hitting mat, on which a user places a ball, is recognized to easily and accurately find the position of the ball even when a slope is realized with respect to a swing plate and the swing plate is sloped at a predetermined angle, and it is possible to accurately sense when hitting has been performed by the user using a relatively inexpensive sensing device without an additional trigger sensor, thereby reducing costs and improving sensing accuracy and reliability.

Technical Solution

In accordance with an aspect of the present invention, the above and other objects can be accomplished by the provision of a sensing device used in a virtual golf simulation apparatus, including at least one capturing means for sequentially acquiring images of a predetermined capturing range within which hitting is performed, a grabber for collecting and storing the images from the at least one capturing means, a shot detector for processing the images received from the grabber to sense whether hitting preparation has been completed and whether hitting has been performed by a user, and an image processing means for processing an image of a golf ball hit by the user, when the shot detector senses that the hitting has been performed, to extract information on physical properties of the moving golf ball.

In accordance with another aspect of the present invention, there is provided a virtual golf simulation apparatus including a sensing device comprising at least one capturing means for sequentially acquiring images of a predetermined capturing range within which hitting is performed, a grabber for collecting and storing the images from the at least one capturing means, a shot detector for processing the images received from the grabber to sense whether hitting preparation has been completed and whether hitting has been performed by a user, and an image processing means for processing an image of a golf ball hit by the user, when the shot detector senses that the hitting has been performed, to extract information on physical properties of the moving golf ball, and an image realization means for realizing a simulation image of a trajectory of the golf ball based on the information extracted by the sensing processing unit.

In accordance with another aspect of the present invention, there is provided a sensing method for virtual golf simulation, including sequentially acquiring images of a predetermined capturing range within which hitting is performed, receiving and storing the sequentially acquired images, processing the stored images to sense whether hitting preparation has been completed, sensing whether hitting has been performed by a user upon sensing that the hitting preparation has been completed, and processing an image of a golf ball hit by the user, upon sensing that the hitting has been performed, to extract information on physical properties of the moving golf ball.

In accordance with a further aspect of the present invention, there is provided a sensing method for virtual golf simulation, including storing a ball template preset as a reference image of a ball, sequentially acquiring images of a predetermined capturing range within which hitting is performed, extracting a ball candidate from the acquired images and comparing the ball candidate with the ball template to find and recognize a ball, determining whether the recognized ball satisfies a predetermined condition to sense whether hitting preparation has been completed, setting a region of a predetermined size around coordinates of the acquired images at which the ball is located as a region of interest, upon determining that the hitting preparation has been completed, and comparing the image present in the region of interest with a half template preset as substantially half of the ball template to determine whether the ball is present in the region of interest, thereby sensing whether hitting has been performed, and processing an image of a golf ball hit by a user, upon sensing that the hitting has been performed, to extract information on physical properties of the moving golf ball.

Advantageous Effects

The virtual golf simulation apparatus and a sensing device and method used for the same according to the present invention has effects that any position of a hitting mat, on which a user places a ball, is recognized to easily and accurately find the position of the ball even when a slope is realized with respect to a swing plate and the swing plate is sloped at a predetermined angle, and it is possible to accurately sense when hitting has been performed by the user using a relatively inexpensive sensing device without an additional trigger sensor, thereby reducing costs and improving sensing accuracy and reliability.

BEST MODE

Now, exemplary embodiments of a virtual golf simulation apparatus according to the present invention and a sensing device and method used for the same will be described in detail with reference to the accompanying drawings.

First, a virtual golf simulation apparatus according to an embodiment of the present invention and a sensing device used in the same will be described with reference to FIGS. 1 and 2.

Figure 1:
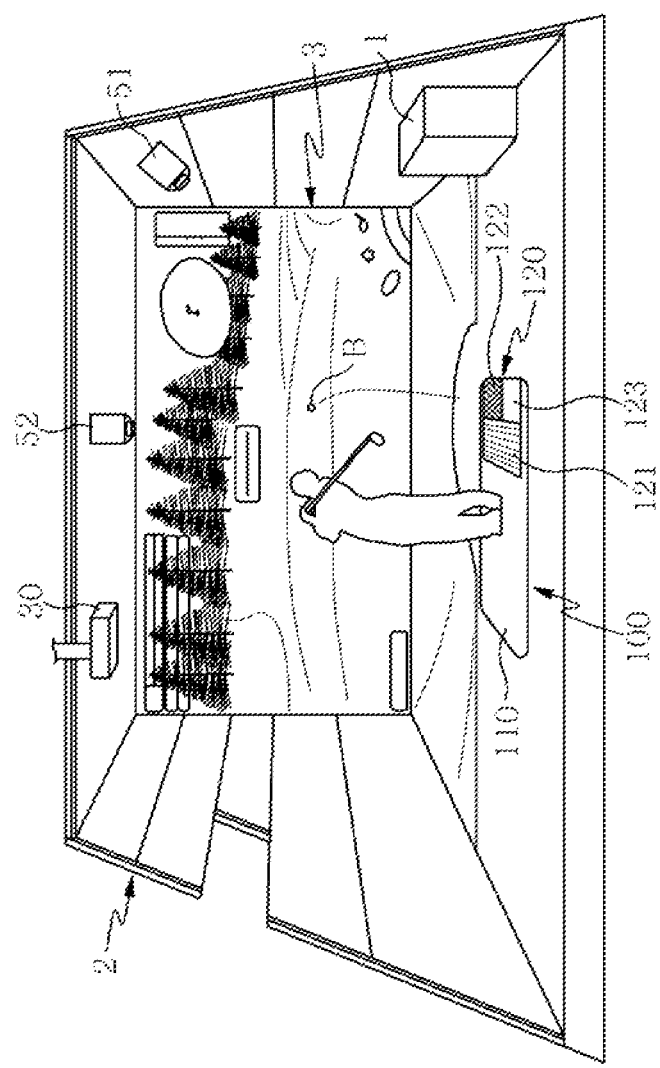
FIG. 1 is a view showing an example of a screen golf system to which a virtual golf simulation apparatus according to an embodiment of the present invention is applied.
Figure 2:
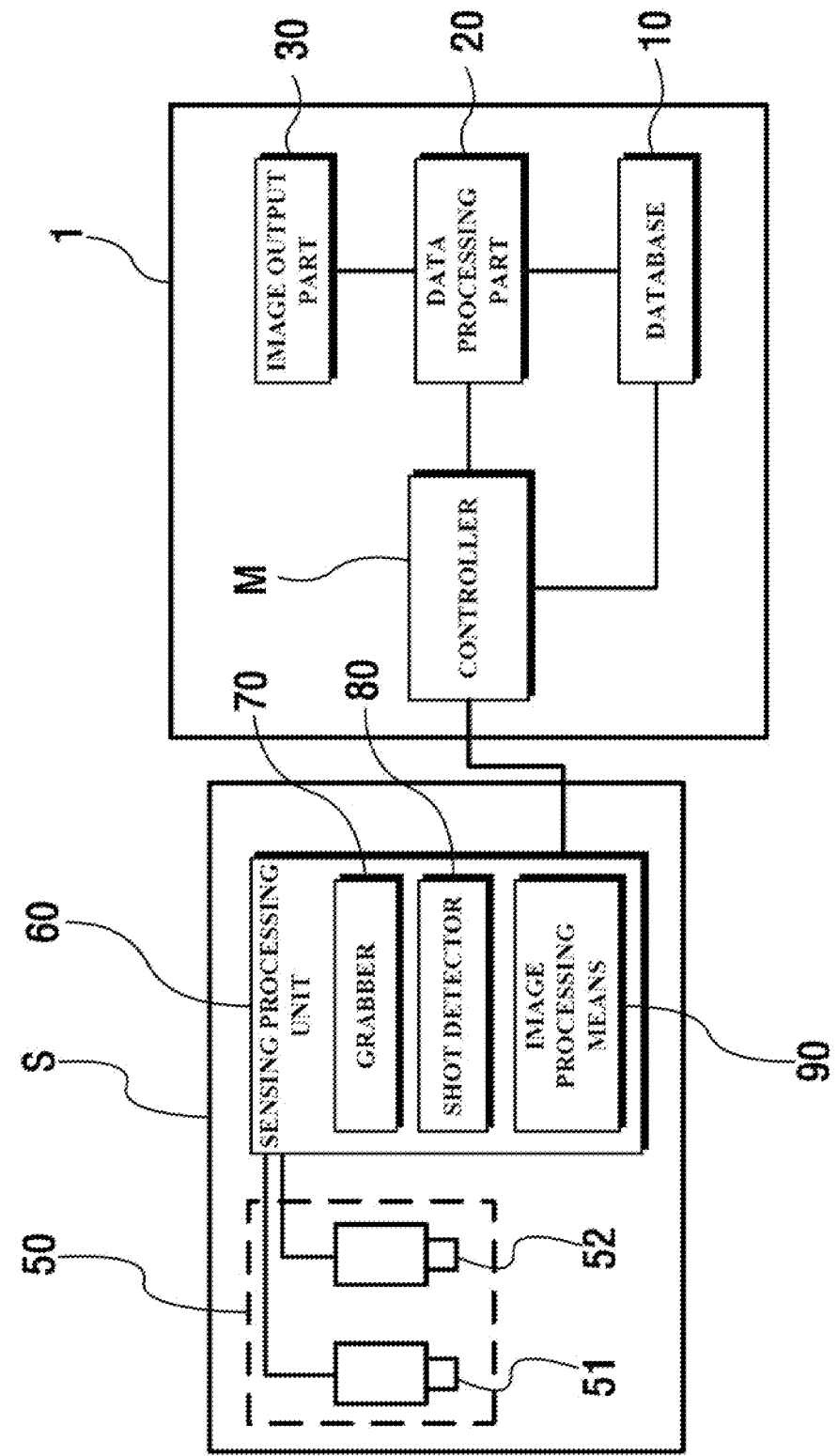
FIG. 2 is a block diagram showing the construction of a virtual golf simulation apparatus according to an embodiment of the present invention.

FIG. 1 is a view showing an example of a screen golf system to which a virtual golf simulation apparatus according to an embodiment of the present invention is applied, and FIG. 2 is a block diagram showing the construction of a virtual golf simulation apparatus applied to the screen golf system shown in FIG. 1.

As shown in FIGS. 1 and 2, the virtual golf simulation apparatus according to the embodiment of the present invention includes a sensing device S for sensing a golf ball B hit by a user and a simulator 1 for realizing an image of a virtual golf course and providing a simulation image of the trajectory of the golf ball B on the virtual golf course based on the result sensed by the sensing device S so that virtual golf simulation can be performed.

As shown in FIG. 1, the screen golf system, to which the virtual golf simulation apparatus according to the embodiment of the present invention is applied, may be configured to have a structure in which a hitting box 110, on which a user hits a golf ball B, is provided on the floor of a golf booth 2 providing a space of a predetermined size, a hitting mat 120, on which a golf ball B is placed so that the user can hit the golf ball B on the hitting box 110, is provided at one side of the hitting box 110, and a screen 3, on which an image of virtual golf simulation output from an image output device (an image output part 30 shown in FIG. 2, such as a beam projector), to which image information is transmitted from the simulator 1, is projected, is provided at the front of the golf booth 2.

The hitting box 110 and the hitting mat 120 are provided on a swing plate 100 as shown in FIG. 1. Alternatively, the hitting box 110 and the hitting mat 120 may be provided on the floor of the golf booth 2.

The swing plate 100 may be provided so that the swing plate 100 can be sloped at a predetermined angle in the frontward and rearward direction and in the left and right direction. Also, the swing plate 100 may be connected to the simulator 1 so that the swing plate 100 can be sloped in correspondence to the topography of a virtual golf course which is presently being realized.

The hitting mat 120 may be formed of artificial turf. As shown in FIG. 1, the hitting mat 120 may be divided into a fairway zone 121, a rough zone 122 and a bunker zone 123 respectively corresponding to a fairway, a rough and a bunker of a real golf course. Preferably, the fairway zone 121, the rough zone 122 and the bunker zone 123 are configured, so that the fairway zone 121, the rough zone 122 and the bunker zone 123 have different lengths of artificial turf or so that the fairway zone 121, the rough zone 122 and the bunker zone 123 are formed of different materials, in a manner similar to the real golf course. FIG. 1 shows that the hitting mat 120 includes the fairway zone 121, the rough zone 122 and the bunker zone 123; however, the present invention is not limited thereto. For example, the hitting mat 120 may include only the fairway zone 121 or may include the rough zone 122 or the bunker zone 123 together with the fairway zone 121. In FIG. 1, reference numeral 124 indicates a tee.

Meanwhile, the sensing device S is provided in the golf booth 2 to sense a golf ball B hit by a user.

As shown in FIG. 1, the sensing device S used in the virtual golf simulation apparatus according to the embodiment of the present invention includes a camera unit 50 and a sensing processing unit 60.

The camera unit 50 may be constituted by a single capturing means for image sensing or two or more capturing means. In order to acquire an image of a moving golf ball B and extract coordinates of the golf ball in a three-dimensional space, it is preferable to configure a stereo type camera unit using two or more capturing means 51 and 52 as shown in FIG. 1.

Meanwhile, as shown in FIG. 2, the sensing device S may include a camera unit 50 including a plurality of capturing means 51 and 52, and a sensing processing unit 60 for processing an image acquired by the camera unit 50 to extract physical properties of the moving golf ball. The physical properties of the moving golf ball may include velocity of the golf ball, a moving direction of the golf ball (a moving angle of the golf ball in the horizontal direction), an altitude angle of the golf ball (a moving angle of the golf ball in the vertical direction), and spin of the golf ball.

The sensing processing unit 60 may include a grabber 70 for sequentially collecting source images acquired by the camera unit 50 on a per frame basis, a shot detector 80 for receiving and processing the frame images collected by the grabber 70 to sense whether hitting preparation has been completed and whether hitting has been performed, and an image processing means 90 for receiving and processing an image of the golf ball hit by the user, when the shot detector 80 senses that the golf ball has been hit by the user, to extract information on physical properties of the moving golf ball.

Meanwhile, the simulator 1 constituting the virtual golf simulation apparatus according to the embodiment of the present invention preferably includes a controller M, a database 10, a data processing part 20 and an image output part 30.

The database 10 stores all data necessary for virtual golf simulation. For example, the database 10 stores data necessary to drive the system, data necessary to realize an image of a virtual golf course, and data necessary to realize a simulation image of the trajectory of a golf ball.

The data processing part 20 is a part which performs predetermined image processing to realize an image of a virtual golf course or a simulation image of the trajectory of a golf ball on the virtual golf course.

The image output part 30 outputs image information received from the data processing part 20 to a screen so that a user can view the image.

The controller M receives information based on the result sensed by the sensing device S to control operations of all components, such as the database 10, the data processing part 20 and the image output part 30, of the simulator 1. That is, the controller M, the database 10 and the data processing part 20 function as an image realization means for realizing a simulation image of the trajectory of a golf ball based on the result sensed by the sensing device S.

Hereinafter, more detailed constructions of the sensing device S shown in FIG. 2 and functions of the respective components constituting the sensing device will be described with reference to FIG. 3.

Figure 3:
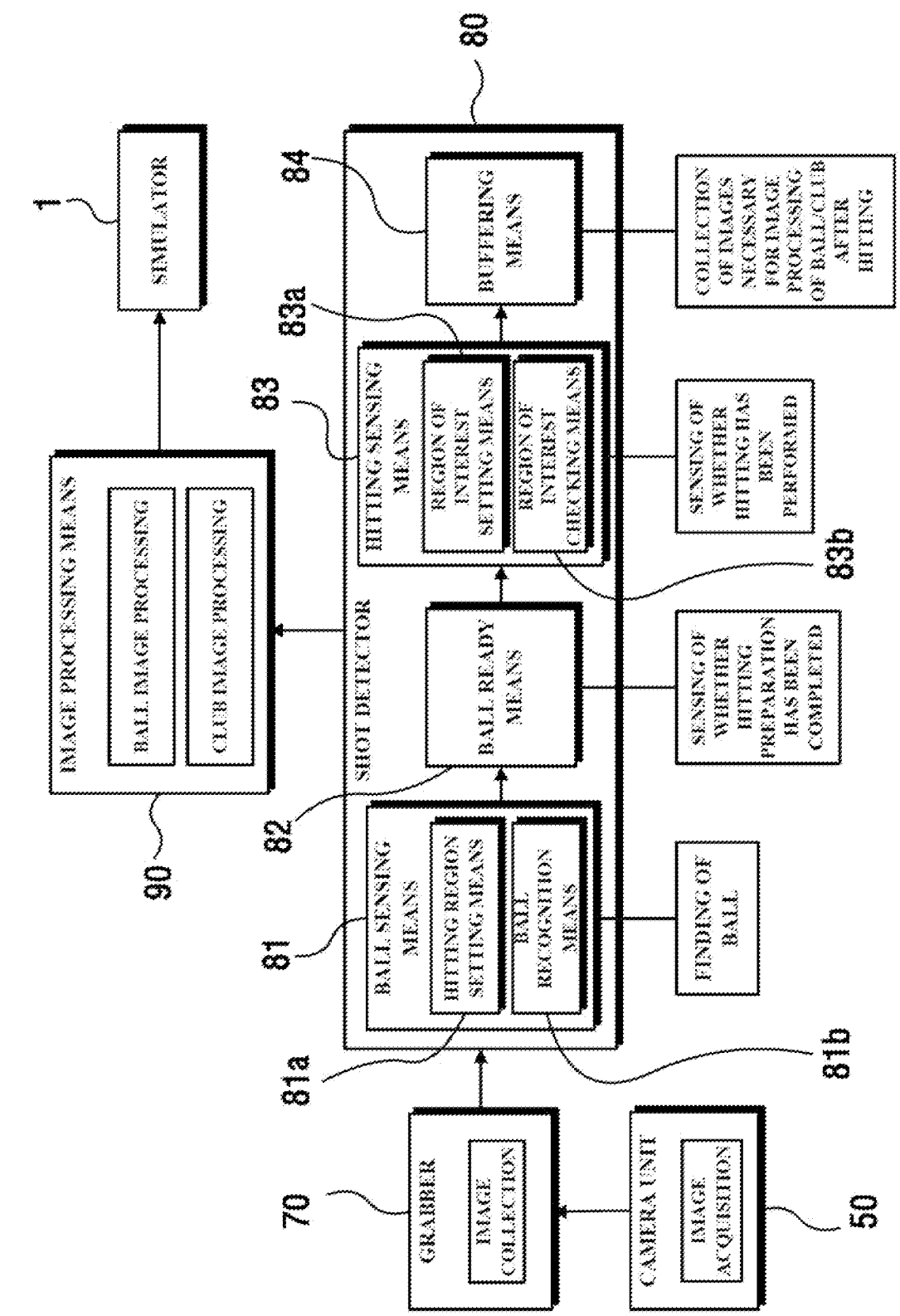
FIG. 3 is a view schematically showing more detailed constructions of a sensing device shown in FIG. 2 and functions of components constituting the sensing device.

As shown in FIG. 3, transmission of information in the sensing device according to the present invention is carried out in the order of the camera unit 50→the grabber 70→the shot detector 80→the image processing means 90→the simulator 1.

The camera unit 50 captures a predetermined range including a portion at which the hitting box and the hitting mat are provided to acquire hundreds of frame images per second.

The acquired frame images are transmitted to the grabber 70. The grabber 70 stores the images received from the camera unit 50 and, at the same time, transmits the images to the shot detector 80 so that image processing is carried out.

Preferably, the shot detector 80 includes a ball sensing means 81 for sensing a ball from the image received from the grabber 70, i.e. finding a ball in the image, a ball ready means 82 for sensing whether the ball sensed by the ball sensing means 81 satisfies a predetermined condition to determine whether hitting preparation has been completed, a hitting sensing means 83 for sensing whether the ball is moved from a position at which the hitting preparation has been completed to determine whether hitting has been performed by a user, and a buffering means 84 for storing a plurality of frame images of the golf ball hit by the user, upon the hitting sensing means 83 sensing that the hitting has been performed, and transmitting the stored frame images to the image processing means.

Preferably, the ball sensing means 81 includes a hitting region setting means 81a for setting a hitting region of a predetermined size, at which hitting is performed, from the image received from the grabber 70 and a ball recognition means 81b for extracting a ball candidate from the set hitting region and finding a ball from the ball candidate.

Figure 4:
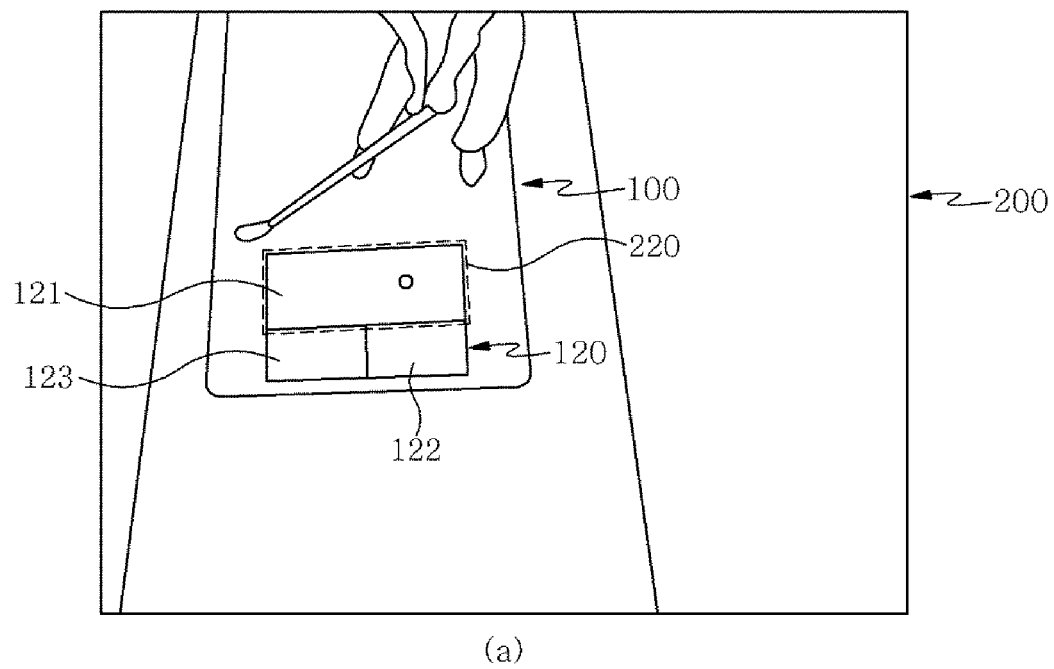
FIG. 4(a) is a view showing a state in which a hitting region is set in a source image.
FIG. 4(b) is a view illustrating a principle of hitting region setting performed by a hitting region setting means.
Figure 4:
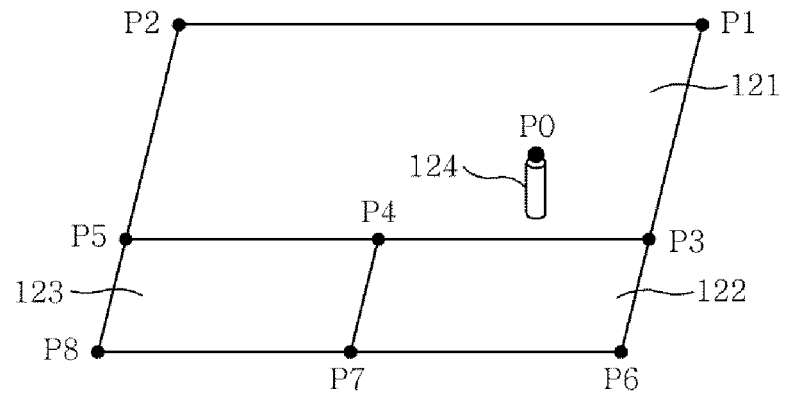

Preferably, a region of the swing plate corresponding to the hitting mat is set as the hitting region, which will be described with reference to FIG. 4.

Figure 5:
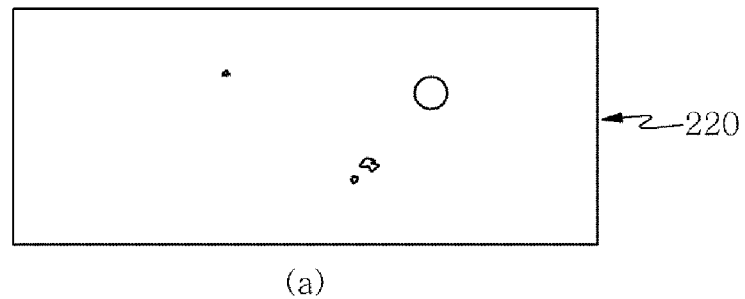
FIG. 5(a) is a view showing a hitting region separated from FIG. 4(a)
FIG. 5(b) is a view showing that an image shown in FIG. 5(a) has been preprocessed.
FIGS. 5(c) and 5(d) are views respectively showing a ball template and a half template.
Figure 5:
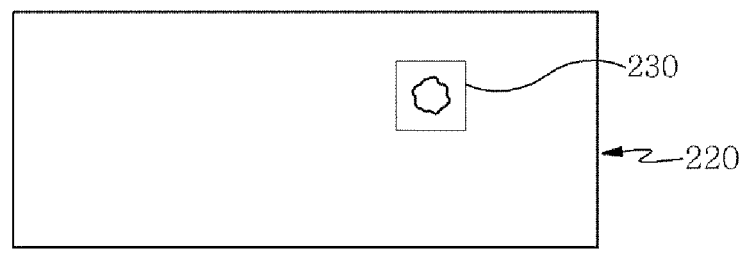
Figure 5:
Figure 5:
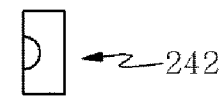

The ball recognition means 81b finds a ball based on a ball template or a half template, which has been preset and stored, which will be described with reference to FIG. 5.

Meanwhile, the hitting sensing means 83 preferably includes a region of interest setting means 83a for setting a region of a predetermined size around position coordinates at which the ball is in a ready state by the ball ready means 82 as a region of interest and a region of interest checking means 83b for determining whether the sensed ball is present in the region of interest to determine whether the ball has been hit. Hitting sensing will be described below in detail.

The shot detector 80 processes the image received from the grabber 70 to sense whether hitting preparation has been completed and, upon sensing that the hitting preparation has been completed, senses whether the user has hit the golf ball placed on the hitting mat using a golf club.

Upon sensing that the user has hit the golf ball, the shot detector 80 stores an image when the golf ball has been hit and a plurality of frame images therebefore and thereafter through the buffering means 84. These images are transmitted to the image processing means 90 in real time so that the images can be processed by the image processing means 90.

The image processing means 90 processes the images received when the shot detector 80 senses the golf ball hit by the user to extract physical properties of the moving golf ball and transmits the extracted physical properties of the golf ball to the simulator 1.

Hereinafter, a process of the shot detector of the sensing device according to the embodiment of the present invention finding a ball from the image received from the grabber will be described with reference to FIGS. 4 to 6.

FIG. 4(a) is a view showing one of several frame source images transmitted from the grabber 70 (see FIG. 3) to the shot detector 80 (see FIG. 3).

The ball sensing means 81 (see FIG. 3) of the shot detector 80 sets a hitting region in a source image through the hitting region setting means 81a (see FIG. 3), separates the hitting region from the source image, and finds a ball from the hitting region through the ball recognition means 81b (see FIG. 3).

First, a hitting region 220 is set in a source image 200 through the hitting region setting means 81a. As shown in FIG. 4(a), a region corresponding to a portion or the entirety of the hitting mat 120 may be set as the hitting region 220. That is, a predetermined region around a position of the hitting mat 120 at which a ball is placed may be set as the hitting region 220.

In the source image 200 shown in FIG. 4(a), a ball is placed on the fairway zone 121 of the hitting mat 120, and the hitting region setting means 81a sets a region corresponding to the fairway zone 121 as the hitting region 220. If the ball is placed on the rough zone 122, a region corresponding to the rough zone 122 may be set as the hitting region. On the other hand, if the ball is placed in the bunker zone 123, a region corresponding to the bunker zone 123 may be set as the hitting region.

If the hitting mat 120 is not fixed on the floor but is provided on the swing plate 100 so that the position of the hitting mat 120 can be changed as the swing plate 100 is sloped at a predetermined angle in correspondence to the topography of a virtual golf course, the hitting region setting means 81a can set the hitting region 220 in the source image 200 with high accuracy in consideration of the above matters.

That is, the hitting region setting means presets reference points P0 to P8 on the hitting mat 120 shown in FIG. 4(b) and stores coordinates of the respective reference points P0 to P8.

If the swing plate 100 is sloped at a predetermined angle, the coordinates of the respective reference points P0 to P8 are changed. The hitting region setting means receives information on an angle at which the swing plate 100 is sloped and calculates changed coordinates of the respective reference points P0 to P8 from the received information.

That is, changed coordinates of the reference points P0 to P8 based on predetermined unit angle change of the swing plate 100 are stored in a database. If the slope of the swing plate is changed, the hitting region setting means refers to the database to retrieve the coordinates of the reference points P0 to P8 and accurately sets the hitting region based on the retrieved coordinates of the reference points P0 to P8.

Meanwhile, if the hitting region 220 is set as shown in FIG. 4(a), the hitting region 220 is separated as shown in FIG. 5(a), and a process of finding a ball from the separated hitting region 220 is carried out. Consequently, it is possible to more rapidly and accurately find the ball than when finding the ball from the entirety of the source image.

An image of the hitting region 220 shown in FIG. 5(a) includes various kinds of noise. A preprocessing process, such as Gaussian blur, is carried out to remove the noise. As a result, an image of the hitting region 220 shown in FIG. 5(b) is obtained.

Subsequently, ball candidates are found from the image shown in FIG. 5(b). The ball candidates may be found based on geometrical properties of the ball. An object having a shape similar to the ball is found from the preprocessed image excluding quadrangular objects or other objects which cannot be considered as a ball, and is selected as a ball candidate. That is, an object having a shape similar to the ball as shown in FIG. 5(b) is selected as a ball candidate 230. A single ball candidate 230 may be selected. Alternatively, a plurality of ball candidates 230 may be selected in a case in which much noise is included in the image.

The extracted ball candidate 230 is compared with a ball template 241 or a half template 242 to calculate a degree of similarity therebetween.

The ball template 241 is preset and stored as a reference image of a ball as shown in FIG. 5(c). The half template 242 is preset and stored as a reference image of a portion of a ball as shown in FIG. 5(d). Preferably, the half template 242 is set as approximately half of the ball template 241.

Consequently, the ball candidate 230 is compared with the ball template 241 or the half template 242 to calculate a degree of similarity therebetween in terms of shapes, pixel values and number of pixels as numerical values.

When the degree of similarity is equal to or greater than a predetermined reference value, the ball candidate may be recognized as a ball.

In a process of recognizing a ball to sense whether hitting preparation has been completed, the ball candidate is preferably compared with the ball template 241 to extract a degree of similarity therebetween.

Of course, the half template 242 may be used to extract a degree of similarity between the ball candidate and the half template 242, thereby recognizing a ball. Since the head of a golf club does not hide a portion of the ball or it is not difficult to completely acquire an image of the ball, however, finding a ball using the ball template 241 is more preferable than finding a ball using the half template 242.

Hereinafter, a process of finding a ball through the ball sensing means and a process of sensing whether hitting preparation has been completed after the ball is found will be described with reference to FIGS. 6 and 7.

Figure 6:
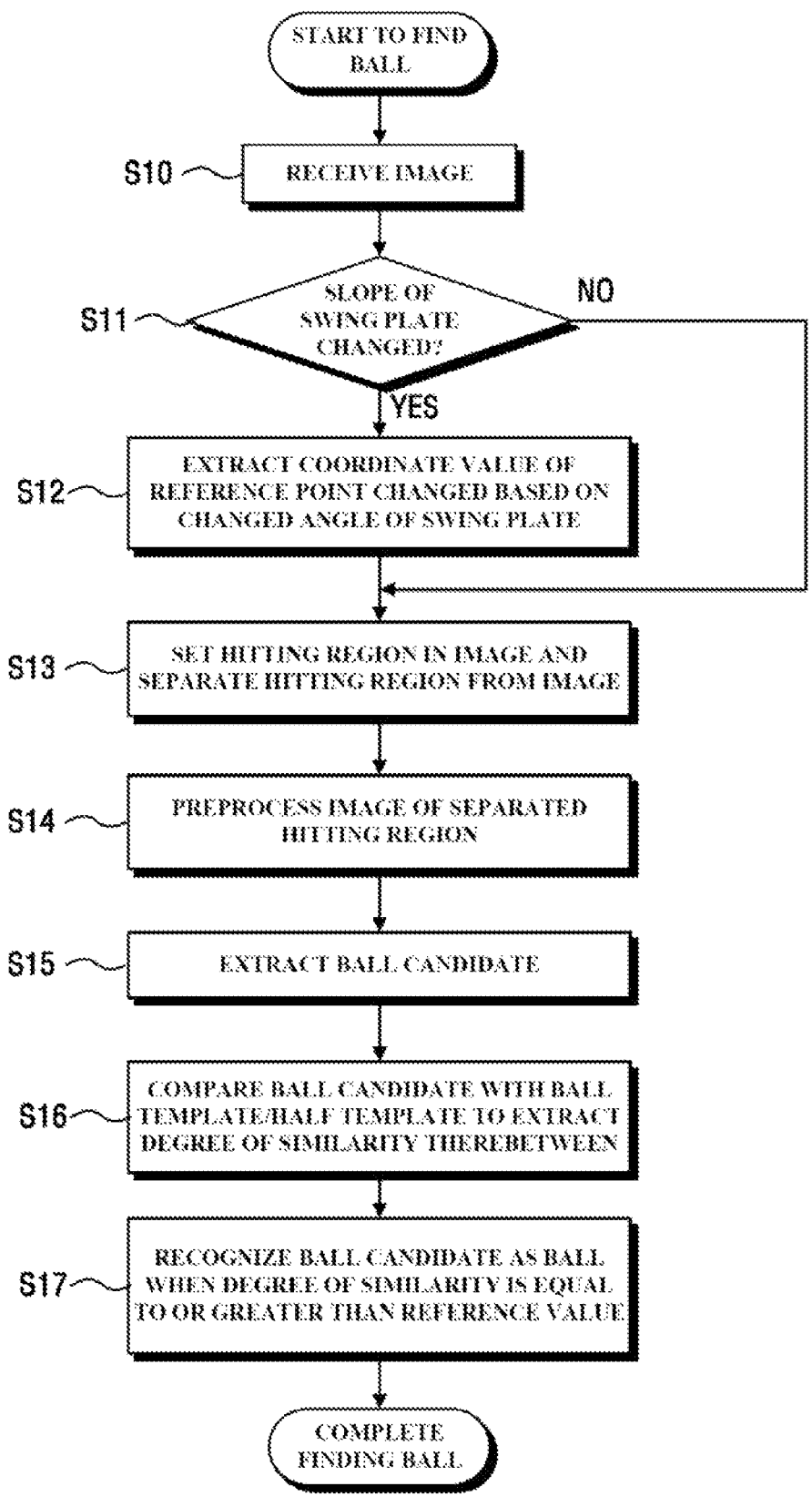
FIG. 6 is a flow chart showing a ball search process performed by a ball sensing means.

Upon receiving an image from the grabber (S10), as shown in FIG. 6, it is determined whether the slope of the swing plate has been changed from a reference position (S11: in this case, it is preferable to determine what angle value the swing plate has).

Upon determining that the slope of the swing plate has not been changed, a hitting region is set in an image, and the hitting region is separated from the image (S13). Upon determining that the slope of the swing plate has been changed, on the other hand, a coordinate value of a reference point changed based on the changed angle of the swing plate is extracted (S12), and coordinates of a hitting region to be set are calculated to set a hitting region in an image and to separate the hitting region from the image (S13).

The image of the separated hitting region is preprocessed (S14) to extract a ball candidate (S15).

Subsequently, the extracted ball candidate is compared with the ball template to extract a degree of similarity therebetween as previously described (S16). If the degree of similarity is equal to or greater than a reference value, the ball candidate is recognized as a ball (S17), and ball finding is completed.

Figure 7:
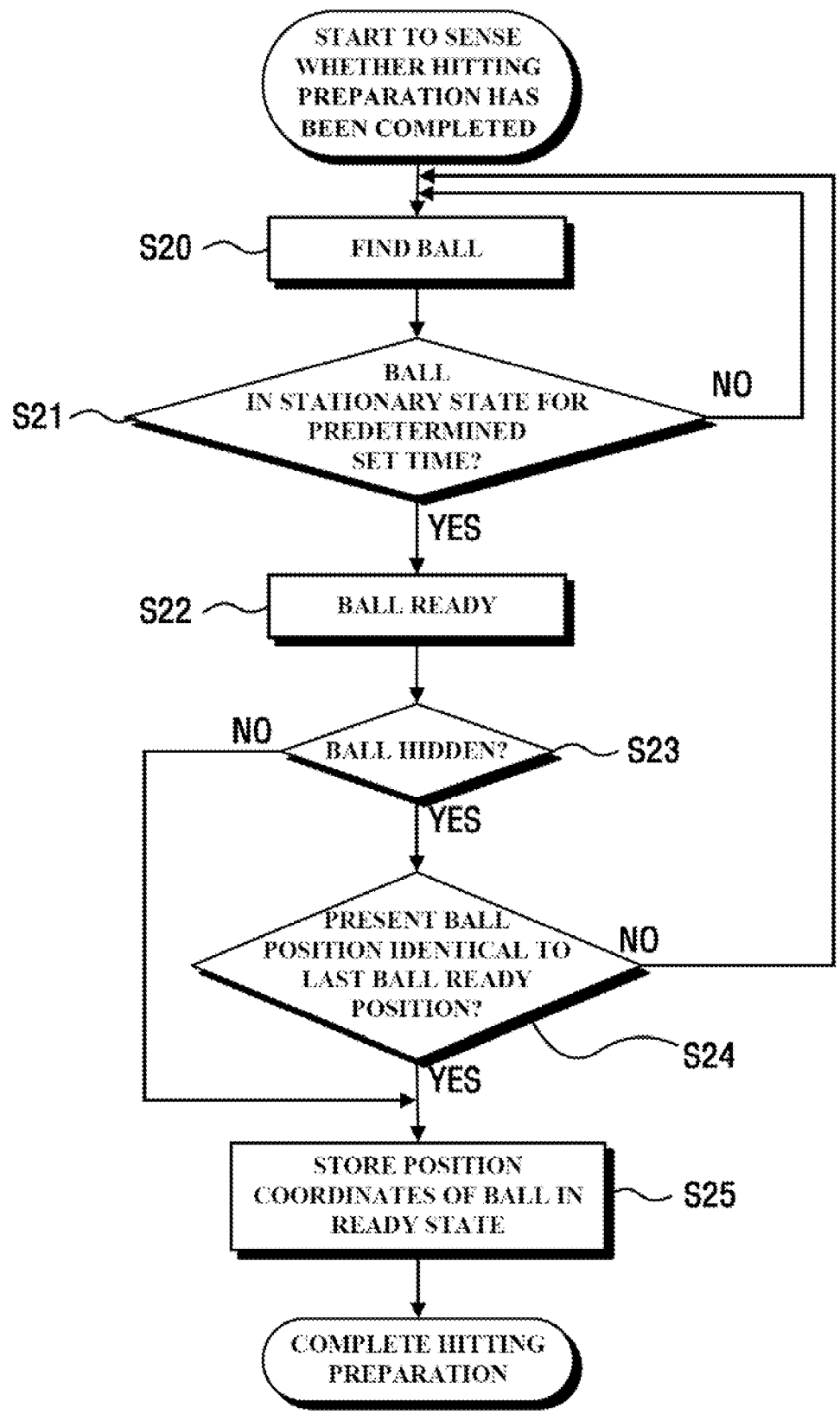
FIG. 7 is a flow chart showing a hitting readiness sensing process performed by a ball ready means.

Meanwhile, if ball finding is completed as shown in FIG. 7 (S20), the ball ready means 82 (see FIG. 3) may sense where the ball is placed on the image and may determine whether the ball is in a stationary state for a predetermined set time (S21).

Upon sensing that the ball is moved within the predetermined set time, the ball finding process shown in FIG. 6 is resumed. Upon sensing that the ball is not moved but is in a stationary state for the predetermined set time, on the other hand, the ball enters into a ball ready state (S22).

In the ball ready state, the ball ready means continues to inspect the image to determine whether any change has been made with respect to the ball. That is, ball hiding may occur in which the ball is not moved but a user hides the ball using a golf club or a portion of the body of the user. The ball ready means senses whether ball hiding has occurred (S23). Upon sensing that the ball hiding has not occurred, position coordinates of the ball in the ball ready state are stored (S25), and hitting preparation is completed.

Upon sensing that the ball hiding has occurred, on the other hand, it is determined whether the present ball position is identical to the last ball ready position (that is, it is determined whether the coordinates of the present ball are equal to those of the ball in the last ball ready state) (S24). Upon determining that the present ball position is equal to the last ball ready position, position coordinates of the ball in the present ball ready state are stored (S25), and hitting preparation is completed. Upon determining that the present ball position is not equal to the last ball ready position, on the other hand, the ball finding process shown in FIG. 6 is resumed.

Figure 8:
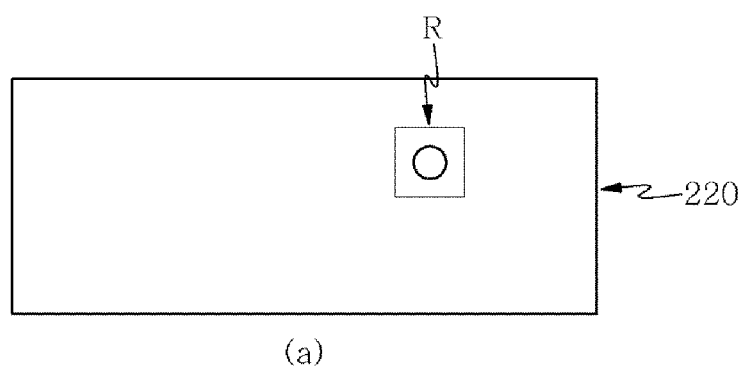
FIG. 8(a) is a view showing a region of interest for hitting sensing.
FIG. 8(b) is a view showing a state in which a ball is not present in the region of interest shown in FIG. 8(a)
Figure 8:
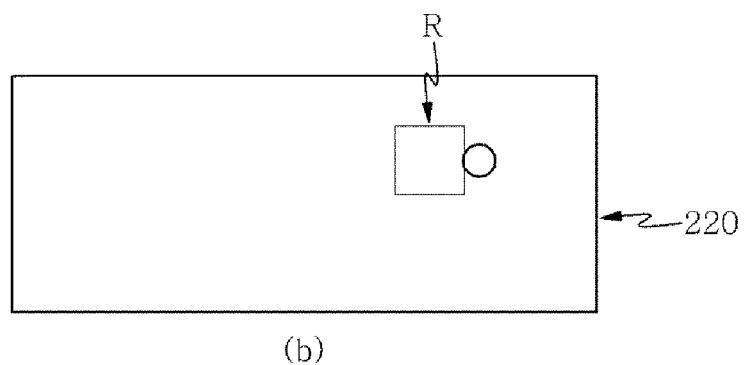
Figure 9:
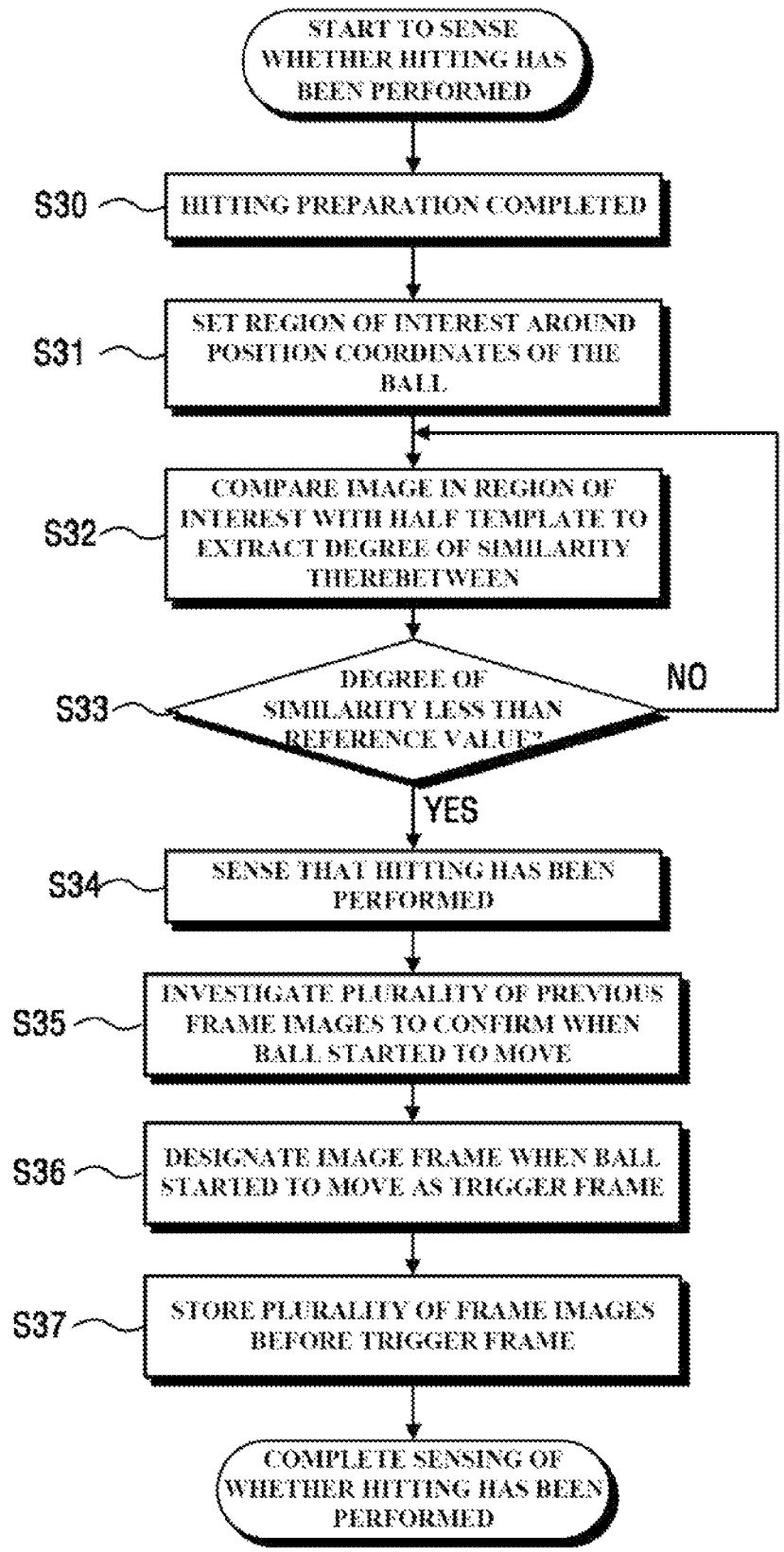
FIG. 9 is a flow chart showing a hitting sensing process performed by a hitting sensing means.

Upon completing ball sensing through the ball sensing means and hitting preparation through the ball ready means as described above, hitting sensing is performed by the hitting sensing means 83 (see FIG. 3) as shown in FIGS. 8 and 9.

First, matters shown in FIG. 8 will be described while explaining a hitting sensing process shown in FIG. 9.

When hitting preparation has been completed as described above (S30), the region of interest setting means 83a of the hitting sensing means 83 (see FIG. 3) sets a region of interest around the stored position coordinates of the ball (S31).

That is, a region of interest R of a predetermined size around the ball is set in the image of the hitting region 220 as shown in FIG. 8(a). The region of interest R is preferably set to have a small size sufficient to include a ball. Whether a user has hit a ball can be easily determined by sensing whether or not the ball is placed in the region of interest R.

Consequently, it is possible to sense that hitting has been performed by sensing that the ball is not placed in the region of interest R from a state shown in FIG. 8(a) to a state shown in FIG. 8(b).

That is, the region of interest checking means 83b (see FIG. 3) compares the image in the region of interest R with the half template 242 (see FIG. 5(d)) to extract a degree of similarity therebetween, thereby determining whether or not the ball is placed in the region of interest R (S32).

The image in the region of interest R may be compared with the ball template 241 or the half template 242. Calculating a degree of similarity using the half template 242 may be more accurate than calculating a degree of similarity using the ball template 241. When a user hits a ball, the head of a golf club comes into contact with the ball with the result that the ball and the club head slightly overlap each other in an image. If the ball template 241 is used in this state, therefore, a degree of similarity may not be accurately calculated. In this case, it is possible to accurately calculate a degree of similarity using the half template 242.

An object present in the region of interest R of the image shown in FIG. 8(b) is completely different from the half template, and therefore, a degree of similarity therebetween is very low. That is, if the degree of similarity extracted at step S32 is less than the reference value (S33), the object present in the region of interest R cannot be recognized as a ball, and therefore, it may be determined that no ball is present in the region of interest R, which means that hitting has been performed (S34).

Upon sensing that hitting has been performed as described above, the hitting sensing means investigates a plurality of frame images received before the hitting has been performed to confirm when the ball started to move (S35), and the image frame when the ball started to move is designated as a trigger frame (S36).

Subsequently, a plurality of frame images before the trigger frame is stored (S37) and transmitted to the image processing means 90 (see FIG. 3) so that frame processing can be carried out by the image processing means 90 to extract physical properties of the moving ball (here, analysis of images before the trigger frame is performed to analyze mainly the moving trajectory of the golf club head, thereby analogizing spin of the ball).

The buffering means 84 (see FIG. 3) of the shot detector 80 (see FIG. 3) sequentially receives and stores the image of the trigger frame and a plurality of frame images after the trigger frame and, at the same time, transmits the images to the image processing means 90 (see FIG. 3) in real time so that frame processing can be carried out by the image processing means 90 to extract physical properties of the moving ball (here, analysis of the image of the trigger frame and the frame images after the trigger frame is performed to analyze velocity, direction and altitude angle of the ball).

MODE FOR INVENTION

Various embodiments of the present invention have been described in the best mode.

INDUSTRIAL APPLICABILITY

The virtual golf simulation apparatus and method and a sensing device and method used for the same according to the present invention can be used in industries related to a golf game or so-called Screen Golf for a user to be able to play a virtual golf round by golf simulation based on a virtual reality.

The invention claimed is:

1. A sensing device of a virtual golf simulation apparatus, comprising:
   at least one camera sequentially acquiring images of a predetermined capturing range within which hitting is performed; and
   a sensing processor including:
   a grabber collecting and storing the images via the at least one camera;
   a shot detector processing the images received from the grabber to sense whether hitting preparation has been completed and whether hitting has been performed by a user, the shot detector,
      setting a hitting region of a predetermined size, at which hitting is performed by the user, from the images received via the grabber and being configured to recognize a ball by extracting at least one ball candidate from the set hitting region and finding the ball from the at least one ball candidate,
      wherein a half template is preset and stored in the shot detector as a reference image of a portion of the ball, and
      comparing a portion of the ball candidate with the half template and calculating a degree of similarity between the portion of the ball candidate and the half template to recognize the ball candidate as the ball when the calculated degree of similarity is equal to or greater than a predetermined reference value; and
   an image processor processing a ball-hit image by the user, when the shot detector senses that the hitting has been performed, to extract information on physical properties of a moving ball.

2. The sensing device according to claim 1, wherein the shot detector is configured to determine whether the recognized ball is in a stationary state for a predetermined set of time and when the recognized ball is in the stationary state for the predetermined set of time the recognized ball enters into a ball ready state.

3. The sensing device according to claim 2, wherein the shot detector,
   senses a ball hiding occurred in the ball ready state and is configured to determine whether a present ball position is identical to a last ball ready position if the ball hiding occurs,
   stores position coordinates of the ball in the present ball ready state and is configured to determine the hitting preparation to be completed if the present ball position is equal to the last ball ready position, and
   resumes to recognize the ball by extracting the at least one ball candidate and finding the ball from the at least one ball candidate if the present ball position is not equal to the last ball ready position.

4. The sensing device according to claim 1, wherein the shot detector detects a movement of the recognized ball to determine whether hitting has been performed by the user.

5. The sensing device according to claim 1, wherein the shot detector stores a plurality of frame images of the ball hit by the user and transmits the stored frame images to the image processor upon sensing that the hitting has been performed by the user.

6. The sensing device according to claim 1, wherein the shot detector sets
   a region of the predetermined size around the recognized ball as a region of interest, and
   is configured to determine whether the recognized ball is present in the region of interest to determine whether the ball has been hit.

7. The sensing device according to claim 1, wherein the shot detector,
sets a region of the predetermined size around the recognized ball as a region of interest,
compares the image present in the region of interest with the half template, and
calculates a degree of similarity between the image present in the region of interest and the half template to determine that hitting has been performed when the degree of similarity is less than a predetermined reference value.

8. A sensing method of a sensing device including at least one camera and a sensing processor for a virtual golf simulation, comprising:
by the at least one camera, sequentially acquiring images of a predetermined capturing range within which hitting is performed;
by the sensing processor,
receiving and storing the sequentially acquired images from the at least one camera;
processing the stored images and sensing whether hitting preparation has been completed;
extracting a ball position from the stored images and setting a region of a predetermined size around the extracted ball position as a region of interest;
comparing a portion of an image present in the region of interest with a half template preset and stored as a reference image of a portion of a ball;
calculating a degree of similarity between the portion of the image present in the region of interest and the half template;
determining whether the calculated degree of similarity is less than a predetermined reference value;
determining that hitting has been performed upon determining that the degree of similarity is less than the predetermined reference value; and
processing a ball-hit image by the user upon sensing that the hitting has been performed, and extracting information on physical properties of a moving ball.

9. The sensing method according to claim 8, wherein the step of sensing whether hitting preparation has been completed comprises:
setting a hitting region of a predetermined size, at which hitting is performed by the user, from the received images;
finding a ball image from the set hitting region and recognizing the ball image as the ball; and
sensing whether the recognized ball satisfies a predetermined condition to determine whether hitting preparation has been completed.

10. The sensing method according to claim 9, wherein the step of recognizing the ball image as the ball comprises:
extracting a ball candidate from the set hitting region based on geometrical properties of the ball; and
comparing the ball candidate with a ball template preset and stored as a reference image of the ball to calculate a degree of similarity therebetween; and
recognizing the ball candidate as the ball when the ball candidate has a degree of similarity equal to or greater than a predetermined reference value.

11. The sensing method according to claim 8, wherein the step of extracting information on physical properties of the moving ball comprises:
investigating a plurality of previous frame images, when the ball is not present in the region of interest, to determine when the ball started to move;
designating an image frame when the ball started to be moved as a trigger frame; and
storing and processing the trigger frame, a plurality of frame images therebefore and a plurality of frame images thereafter.

12. A sensing method of a sensing device including at least one camera and a sensing processor for a virtual golf simulation, comprising:
storing, by the sensing processor, a ball template preset as a reference image of a ball and a half template preset as substantially half of the ball template; and
sequentially acquiring, by the at least one camera, images of a predetermined capturing range within which hitting is performed,
wherein the sensing processor comprises the steps of:
extracting a ball candidate from the acquired images and comparing the ball candidate with the ball template to find and recognize the ball;
calculating a degree of similarity between the ball candidate and the ball template;
recognizing the ball candidate as the ball when the calculated degree of similarity equal to or greater than a predetermined reference value;
extracting a position of the recognized ball and setting a region of a predetermined size around the extracted position of the recognized ball;
comparing a portion of an image present in the region of interest with the half template;
calculating a degree of similarity between the portion of the image present in the region of interest and the half template;
determining whether the calculated degree of similarity is less than a predetermined reference value;
determining that hitting has been performed upon determining that the degree of similarity is less than the predetermined reference value; and
processing an image of a ball hit by a user, upon sensing that the hitting has been performed, to extract information on physical properties of the moving ball.

* * * * *